United States Patent
Janssen et al.

(10) Patent No.: US 11,398,919 B2
(45) Date of Patent: Jul. 26, 2022

(54) METHOD FOR DETECTING NETWORK SUBSCRIBERS IN AN AUTOMATION NETWORK AND AUTOMATION NETWORK

(71) Applicant: Beckhoff Automation GmbH, Verl (DE)

(72) Inventors: Dirk Janssen, Verl (DE); Florian Essler, Augsburg (DE); Guido Beckmann, Verl (DE); Hans Beckhoff, Verl (DE); Holger Büttner, Berlin (DE); Martin Rostan, Nuremberg (DE); Thomas Rettig, Rheda-Wiedenbrück (DE)

(73) Assignee: Beckhoff Automation GmbH, Verl (DE)

( * ) Notice: Subject to any disclaimer, the term of this patent is extended or adjusted under 35 U.S.C. 154(b) by 0 days.

(21) Appl. No.: 17/218,571

(22) Filed: Mar. 31, 2021

(65) Prior Publication Data

US 2021/0218584 A1 Jul. 15, 2021

Related U.S. Application Data

(63) Continuation of application No. PCT/EP2020/063186, filed on May 12, 2020.

(30) Foreign Application Priority Data

May 28, 2019 (DE) .......................... 102019114303.9

(51) Int. Cl.
*H04L 12/12* (2006.01)
*H04L 12/40* (2006.01)

(52) U.S. Cl.
CPC ........ *H04L 12/12* (2013.01); *H04L 12/40169* (2013.01); *H04L 2012/4026* (2013.01)

(58) Field of Classification Search
CPC ......... H04L 12/02; H04L 12/12; H04L 12/40; H04L 12/40169; H04L 2012/4026
See application file for complete search history.

(56) References Cited

U.S. PATENT DOCUMENTS

| 6,943,667 B1* | 9/2005 | Kammer | G06F 1/3203 709/227 |
| 2009/0119437 A1* | 5/2009 | Hilscher | H04L 12/4625 710/305 |

(Continued)

FOREIGN PATENT DOCUMENTS

| DE | 102007058267 A1 | 6/2009 |
| DE | 102014106019 A1 | 10/2015 |

(Continued)

OTHER PUBLICATIONS

Office Action dated Apr. 6, 2020 in connection with German Patent Application No. 10 2019 114 303.9, 15 pages including English translation.

(Continued)

*Primary Examiner* — Jenee Holland
(74) *Attorney, Agent, or Firm* — Dorsey & Whitney LLP (57) ABSTRACT

A method for detecting network subscribers in an automation network by query telegrams provides that a protocol-network subscriber enters network-subscriber information into a query telegram and sends the query telegram to a subsequent network subscriber. If no subsequent network subscriber is connected to a data line, other than the receiving data line, it sends the query telegram back to the configuration subscriber. A network distributor enters port information on the further input/output ports of the network distributor, to which further data lines are connected into the query telegram, and returns it to the configuration subscriber. The configuration subscriber subsequently generates further query telegrams, each with routing information on (Continued)

the basis of the port information, and sends them to the network distributor. The network distributor outputs them on the further input/output port assigned to the respective routing information, in order to detect network subscribers connected to the respective further input/output ports.

14 Claims, 2 Drawing Sheets

(56) References Cited

U.S. PATENT DOCUMENTS

| | | | | |
|---|---|---|---|---|
| 2012/0330478 | A1* | 12/2012 | Malsch | H04L 12/12 |
| | | | | 700/297 |
| 2014/0036735 | A1* | 2/2014 | Hall | H04L 45/128 |
| | | | | 370/276 |
| 2014/0047056 | A1 | 2/2014 | Tahara et al. | |
| 2014/0226459 | A1* | 8/2014 | Edmiston | H04L 41/0816 |
| | | | | 370/216 |
| 2016/0323143 | A1* | 11/2016 | Kim | G06F 3/0629 |
| 2018/0024537 | A1* | 1/2018 | Chauvet | G06F 9/50 |
| | | | | 718/104 |

FOREIGN PATENT DOCUMENTS

| | | |
|---|---|---|
| DE | 102014112082 A1 | 2/2016 |
| EP | 2672657 A1 | 12/2013 |
| EP | 3179672 A1 | 6/2017 |

OTHER PUBLICATIONS

International Search Report and Written Opinion dated Aug. 3, 2020 in connection with International Patent Application No. PCT/EP2020/063186, 29 pages including English translation.

Decision to Grant dated Jun. 2, 2020 in connection with German Patent Application No. 10 2019 114 303.9, 12 pages including English translation.

* cited by examiner

Fig. 1

METHOD FOR DETECTING NETWORK SUBSCRIBERS IN AN AUTOMATION NETWORK AND AUTOMATION NETWORK

CROSS REFERENCE TO RELATED APPLICATIONS

This application claims priority to International Patent Application PCT/EP2020/063186, filed May 12, 2020, and to German Patent Application DE 10 2019 114 303.9, filed May 28, 2019, entitled VERFAHREN ZUM ERFASSEN VON NETZWERKTEILNEHMER IN EINEM AUTOMATISIERUNGSNETZWERK UND AUTOMATISIERUNGSNETZWERK, each of which is incorporated by reference herein, in the entirety and for all purposes.

FIELD

The present invention relates to a method for detecting network subscribers in an automation network by query telegrams. The present invention further relates to an automation network which is embodied for the transmission of query telegrams. The present invention further relates to a configuration subscriber and a network distributor which are embodied to carry out the method for detecting network subscribers.

BACKGROUND

Machines or plants of an automation system are often controlled by programmable logic controllers (PLC). In order to control the actuators and sensors of the machine or plant, the PLC usually uses a communication interface, which may be implemented in the form of a field-bus system. Field-bus systems are bus systems in which decentrally arranged devices of a machine periphery such as input and/or output modules, actuators and sensors of a machine or plant, drives and operating terminals are connected to control units via the field-bus system. A shared data line in the form of the field-bus or e.g. embodied as a radio link is available for transmitting data. In particular, if a plurality of network subscribers sends telegrams simultaneously, the field-bus system provides the possibility for the network subscribers to share the data line. This may be carried out e.g. by the so-called "master-slave principle".

As a rule, the control units on the field bus are the active bus subscribers, the so-called "master-network subscribers". The master-network subscribers have the access authorization of the field-bus system and define the data traffic in the form of telegrams on the field bus. The passive field-bus subscribers, which are also referred to as "slave-network subscribers", usually correspond to the machine peripherals. The slave-network subscribers have no access authorization and may only acknowledge received data and/or telegrams or transmit data and/or telegrams at the request of a master-network subscriber.

The network subscribers in the automation network may include protocol-network subscribers which are configured to process a specific data-transmission protocol. These may e.g. be embodied as slave-network subscribers. In addition, the automation network may include a configuration subscriber that is embodied as a master-network subscriber and may configure the network subscribers of the automation network. In the following, the slave-network subscribers are referred to as protocol-network subscribers and the master-network subscribers as configuration subscribers. In addition, the automation network may also contain network subscribers that process a data-transmission protocol that differs from the specific data-transmission protocol. For example, the specific data-transfer protocol may be implemented in the form of the EtherCAT-data-transfer protocol which is used for control operation.

In automation networks in which data traffic is carried out by telegrams with the underlying EtherCAT data-transfer protocol, hereinafter referred to as EtherCAT networks, the telegrams are routed through all protocol-network subscribers and, in the case of a chain of protocol-network subscribers connected to a data line, are sent back from the last protocol-network subscriber to the configuration subscriber. Routing refers to the definition of transmission paths for the transmission of telegrams in the automation network. A disadvantage of such an EtherCAT network is the fact that the EtherCAT network is usually only operated at one data-transfer rate (usually 100 Mbit/s), and particularly in EtherCAT networks that are becoming increasingly large and complex or in those in which a large amount of data is produced, for example due to vision cameras or measuring devices used having high scanning rates, the capacity limits are reached. In addition, the run-time of the telegram through the automation network may also increase with increasing size of the automation network with a large number of protocol-network subscribers, since each protocol-network subscriber reads the output data of the telegram addressed to it on the fly and places its input data in the forwarded telegram, passing through all protocol-network subscribers. Sending a telegram from a protocol-network subscriber in an EtherCAT network corresponds to entering information into the telegram sent by the configuration subscriber and forwarding the telegram to a network subscriber following in the direction of the telegram, since a protocol-network subscriber in an EtherCAT network itself does not send any acknowledgement or response telegrams at the request of the configuration subscriber. If in the following general reference is made to the sending of a protocol-network subscriber or a network distributor, this fully covers the above-described functionality.

Telegram runtimes through the EtherCAT network are particularly relevant for very short cycle times. The cycle time describes the interval between two program cycles of the PLC. In this context, the cycle time should be at least as long as the time taken by the program cycle of the PLC itself. If the telegrams are transmitted synchronously to the program cycle, the telegrams are transmitted with the cycle time of the PLC program. Hereby, the processing time of a telegram by the EtherCAT network should be shorter than the cycle time itself. To further optimize the process, the telegrams may be sent after the output data have been provided by the PLC and should be received back before the input data are read in by the PLC. In this case, the cycle time should be longer than the time taken up by the PLC program cycle and the processing time of the telegrams by the EtherCAT network.

Network distributors, so-called "switches", are usually used in automation networks to connect the individual data lines with the connected network subscribers and to ensure that the data and/or telegrams reach their destination via the network subscribers connected to the individual input/output ports of the network distributors via further data lines. However, this requires that the structure of the automation network and the network subscribers connected to the individual input/output ports of the respective network distributor are known in order to be able to output the telegrams sent for control tasks in the EtherCAT network to protocol-network subscribers that are to contribute within the framework of the control task.

SUMMARY

The present invention provides a method for detecting network subscribers in an automation network which allows for a simplified determination of a network structure and an optimized configuration. Furthermore the present invention provides an improved configuration subscriber and an improved network distributor in the automation network, which increase the data throughput in the automation network.

EXAMPLES

According to an aspect, a method for detecting network subscribers in an automation network by query telegrams sent by a configuration subscriber is proposed. The network subscribers in the automation network are connected via data lines, wherein the network subscribers comprise at least one protocol-network subscriber which is embodied to process a specific data-transmission protocol, and the network subscribers comprise at least one network distributor which has input/output ports. When a protocol-network subscriber receives a query telegram over a data line, the protocol-network subscriber enters network-subscriber information into the query telegram and sends the query telegram to a subsequent network subscriber over a data line other than the receiving data line. If no subsequent network subscriber is connected to a further data line, the protocol-network subscriber returns query telegram to the configuration subscriber via the receiving data line. If a network distributor receives the query telegram via the data line on a first input/output port, the network distributor enters a port information about the further input/output ports of the network distributor to which further data lines are connected into the query telegram and returns the query telegram to the configuration subscriber via the receiving data line. If the configuration subscriber receives the query telegram from the network distributor via the data line, the configuration subscriber then generates further query telegrams each with routing information on the basis of the port information and sends them to the network distributor via the data line. The network distributor outputs the further query telegrams on the further input/output port assigned to the respective routing information in order to detect network subscribers connected to the respective further input/output ports of the network distributor via the further data lines.

According to another aspect, an automation network having network subscribers which are connected via data lines is proposed. The network subscribers in the automation network have at least one protocol-network subscriber embodied to process a specific data-transmission protocol, and the network subscribers comprise at least one network distributor having input/output ports. A configuration subscriber is embodied to send a query telegram via a data line. A protocol-network subscriber is embodied, when the protocol-network subscriber receives the query telegram via a data line, to enter network-subscriber information into the query telegram and send the query telegram to a subsequent network subscriber via a data line other than the receiving data line. If no subsequent network subscriber is connected to further data line, the protocol-network subscriber is embodied to return the query telegram to the configuration subscriber via the receiving data line. A network distributor is embodied, when the network distributor receives the query telegram over the data line on a first input/output port, to enter a port information on further input/output ports of the network distributor, to which further data lines are connected, into the query telegram and return the query telegram to the configuration subscriber via the receiving data line. The configuration subscriber is embodied when the configuration subscriber receives the query telegram from the network distributor over the data line to generate, on the basis of the port information, further query telegrams with one routing information each and to send them to the network distributor via the data line. The network distributor is embodied to output the further query telegrams in each case on the further input/output port assigned to the respective routing information, and to detect network subscribers connected to the respective further in-put/output ports of the network distributor via the further data lines.

According to a further aspect, a configuration subscriber which is embodied to carry out a method for detecting network subscribers in an automation network by query telegrams sent by the configuration subscriber is proposed. When a protocol-network subscriber receives a query telegram over a data line, the protocol-network subscriber enters a network-subscriber information into the query telegram and sends the query telegram to a subsequent network subscriber. If no subsequent network subscriber is connected to another data line, other than the receiving data line, the protocol-network subscriber returns the query telegram to the configuration subscriber. A network distributor enters a port information on further input/output ports of the network distributor, to which further data lines are connected, into the query telegram and returns the query telegram to the configuration subscriber. The configuration subscriber generates further query telegrams, each with a routing information on the basis of the port information, and sends them to the network distributor. The network distributor outputs the further query telegrams in each case on the further in-put/output port assigned to the respective routing information in order to detect network subscribers, which are connected to the respective further input/output ports of the network distributor.

BRIEF DESCRIPTION OF THE DRAWINGS

The features, characteristics and advantages of the present invention described above, as well as the way in which these are achieved, will be more clearly and more comprehensibly explained in connection with the following description of embodiment examples, which will be explained in more detail in conjunction with the schematic drawings, in which.

DETAILED DESCRIPTION

It is pointed out that the figures are only schematic in nature and not true to scale. In this sense, components and elements shown in the figures may be shown in an exaggeratedly large or reduced scale for better understanding. Furthermore, it is pointed out that the reference numerals remain the same if they refer to the same elements and/or components and/or sizes.

Automation networks are usually implemented as field-bus systems in which the network subscribers, which include protocol-network subscribers and network distributors, are networked with one another via the field bus. The protocol-network subscribers may be configured to process a specific data-transmission protocol. Protocol-network subscribers and network distributors may exchange data with control units, wherein real-time-capable data-transmission protocols are generally used for this purpose. In addition, the automation network may also comprise network subscribers that may process other data-transmission protocols such as TCP/IP (TCP/IP: Transmission Control Protocol/Internet Protocol), Ethernet, etc. These network subscribers do not have to be addressed for control tasks. For example, this data-transmission-protocol data may include diagnostic information about the automation network. The invention is explained below using the real-time capable EtherCAT data-transmission protocol as an example.

The access authorization for the field-bus system is based on the master-slave hierarchy. The active bus subscribers, also referred to as master-network subscribers, correspond to the control units that determine and coordinate the transmission of data on the field-bus. The passive bus subscribers referred to as slave-network subscribers which do not have their own bus access rights, on the other hand form the devices of the machine periphery and are allowed to insert information into the telegrams in the EtherCAT network and return these telegrams to the master-network subscriber. The network subscribers connected via the individual data lines in the automation network are connected via network distributors also referred to as "switches" or "branches". The network distributors also serve to coordinate the data exchange of the subscribers in the network segments and to forward the telegrams to their destination in time.

The core idea of the proposed method, automation network, configuration subscriber, and network distributor is—if the structure of the automation network is unknown—to detect the network subscribers in the automation network in a step-by-step manner by query telegrams sent by a master-network subscriber or by a configuration subscriber. Based on this, the automation network may be configured and structured according to certain criteria in order to increase the throughput in the automation network.

The structure and the mode of operation of the automation network and of the method is described in the following on the basis of FIGS. 1 and 2, wherein the associated reference numerals from both figures are used in the description, if reasonable and necessary.

A method for detecting network subscribers in an automation network by query telegrams sent by a configuration subscriber and an associated automation network are proposed. The network subscribers in the automation network are connected via data lines, wherein the network subscribers comprise at least one protocol-network subscriber which is embodied to process a specific data-transmission protocol, and the network subscribers comprise at least one network distributor which has input/output ports. When a protocol-network subscriber receives a query telegram over a data line, the protocol-network subscriber enters network-subscriber information into the query telegram and sends the query telegram to a subsequent network subscriber over a data line other than the receiving data line. If no subsequent network subscriber is connected to a further data line, the protocol-network subscriber returns query telegram to the configuration subscriber via the receiving data line. If a network distributor receives the query telegram via the data line on a first input/output port, the network distributor enters a port information about the further input/output ports of the network distributor to which further data lines are connected into the query telegram and returns the query telegram to the configuration subscriber via the receiving data line. If the configuration subscriber receives the query telegram from the network distributor via the data line, the configuration subscriber then generates further query telegrams each with routing information on the basis of the port information and sends them to the network distributor via the data line. The network distributor outputs the further query telegrams on the further input/output port assigned to the respective routing information in order to detect network subscribers connected to the respective further input/output ports of the network distributor via the further data lines.

With the proposed method, the structure of the automation network, i.e. the network structure and the network subscribers arranged therein, may be detected step-by-step and in a flexible manner. The network structure may be chosen as desired and adapted to the respective industrial requirements. In particular, determining the network subscribers of the automation network step-by-step may allow for faster processing of the received information, and a network structure may be created or, respectively, dynamically adapted therefrom.

The method may be used advantageously to determine protocol-network subscribers that e.g. process the EtherCAT-data-transfer protocol if the configuration subscriber is embodied as an EtherCAT-master-network subscriber in an underlying master-slave hierarchy. Herein, sending a telegram from a protocol-network subscriber in an EtherCAT network corresponds to entering information into the telegram sent by the master-network subscriber or configuration subscriber and forwarding the telegram to a network subscriber following in the direction of the telegram, since a protocol-network subscriber in an EtherCAT network does not itself send any acknowledgement or response telegrams upon request of the master-network subscriber or configuration subscriber. If the configuration subscriber is, for example, embodied as a standard Ethernet-master-network subscriber, i.e. it creates and processes query and/or configuration telegrams with the underlying Ethernet-data-transmission protocol, protocol-network subscribers that process the Ethernet-data-transmission protocol may be determined using this method. The advantage here is that the proposed method is not limited to a certain predefined data-transmission protocol, but may be used variably.

A receiving data line in the sense of the proposed method, automation network, configuration subscriber, and network distributor is a data line over which a network subscriber has received a telegram and, after processing, re-sends the telegram over the same data line over which the network subscriber previously received the telegram. If the network subscriber sends the telegram over a data line over which the network subscriber did not receive the telegram before, this is generally referred to as a data line or a further data line.

In order to determine the network subscribers connected to the individual further input/output ports of the network distributor via the further data lines, the configuration subscriber sends further query telegrams. The further query telegrams are output individually via the further data lines connected to the further input/output ports in order to be able to detect the network subscribers connected to them in the best possible way. This means that a further query telegram does not pass through the individual further input/output ports with the further data lines one after the other, but the individual further input/output ports of the network distributor with the network subscribers connected via the further data lines are processed in parallel or at least partially in parallel by the further query telegrams. For example, the output of the further telegrams via the individual further input/output ports of the network distributor may be priority-controlled and/or time-controlled. Parallel processing may significantly reduce the processing times of the query telegrams, particularly in large automation networks with many network subscribers, and may have an advantageous effect on a short cycle time (for example ≤1 ms). In this context, different data-transmission rates via the individual input/output ports of the network distributor are also conceivable for the parallel output of further query telegrams for data communication.

By sending a plurality of query telegrams via the individual further input/output ports of the network distributor, it is more probable for the configuration subscriber, compared to a single query telegram, that the plurality of query telegrams will be returned to the configuration subscriber by the network subscribers connected to the respective input/output ports via the corresponding further data line. The configuration subscriber may e.g. conclude from an unanswered query telegram that the corresponding network subscriber or, respectively, at least one network subscriber connected via the respective further input/output port of the network distributor does not process the data-transmission protocol on which the query telegram and the further query telegram are based. In principle, a network subscriber which does not process the data-transmission protocol on which the query telegram is based may send the query telegram to the network subscriber subsequently connected to the data line, but the network subscriber does not return the query telegram to the configuration subscriber in the event that no subsequent network subscriber is connected to the data line.

The network subscribers connected to the individual further input/output ports of the network distributor via the further data lines enter the network-subscriber information as well as the port information as protocol-network subscribers and as network distributor into the respective further query telegram as described above. In the case of a further network distributor which has been determined as such by the configuration subscriber in the automation network, the configuration subscriber proceeds according to the above procedure and re-sends further query telegrams to the further network distributor, which the further network distributor outputs via the individual further input/output ports of the further network distributor via the network subscribers connected to the further data lines. The configuration subscriber continues in this way until the configuration subscriber no longer detects any further network distributors connected to the individual input/output ports of the network distributor via the further data lines.

In addition to entering the network-subscriber information and the port information in the query telegram, it may also be provided to read out the network-subscriber information and the port information with the query telegram from a register, i.e. a memory unit of the protocol-network subscriber and the network distributor, and to transmit the read-out information to the configuration subscriber via the data line or the receiving data line.

In a further embodiment, the routing information is preset in the network distributor. The port information includes the routing information. The network distributor enters the port information into the query telegram and returns the query telegram to the configuration subscriber via the receiving data line. If, for example, the automation network is an automation network in which the query telegrams are sent using the EtherCAT-data-transfer protocol, routing is not required to address a single protocol-network subscriber, since the query telegrams are routed through all protocol-network subscribers within a segment. In this context, the respective routing information may, for example, include a port address or segment address, via which the respective further input/output port of the network distributor or the EtherCAT segment connected to it may be addressed and via which or to which a further query telegram is to be output. In particular, presetting the routing information may reduce the time and effort involved.

For the structuring of the EtherCAT network in EtherCAT segments, different configurations are conceivable. For example, an EtherCAT segment may start at a further input/output port of a network distributor, via which only protocol-network subscribers are connected. Furthermore, an EtherCAT segment may start at a further input/output port of a network distributor, which is used to connect protocol-network subscribers and network distributors. In addition, an EtherCAT segment may start at the configuration subscriber and end at the next network distributor. In order to simplify the description of the EtherCAT segments, the associated data lines have not been further described. In particular, a structuring of the EtherCAT segments may be implemented advantageously after the network subscribers of the automation network have been detected.

According to another embodiment, after receiving the query telegram comprising the port information from the network distributor and prior to sending further query telegrams, the configuration subscriber sends a configuration telegram via the data line to the network distributor in order to assign routing information based on the port information to the further input/output ports of the network distributor. The assignment of the routing information after the query telegram has been received from the configuration subscriber provides an individual and dynamic setting option for the further input/output ports of the network distributor, which may be carried out in an optimized manner on the basis of the information already determined. Herein, the routing information may also be in the form of a port address or a segment address.

In a further embodiment, the configuration subscriber defines a time window in which the configuration subscriber expects to receive a returned query telegram. If the configuration subscriber does not receive a query telegram within the defined time window, the configuration subscriber excludes the data line on which the query telegram was sent from further data communication. The data line may also be embodied as the receiving data line or as the further data line and may be excluded from further data communication. The determined time window provides a safety mechanism where a reaction is expected. It may happen, for example, that at a certain further input/output port of the network distributor, on the further data line, in addition to one or more protocol-network subscribers, a network subscriber is connected which does not process the data-transmission protocol. In this context, it is conceivable that individual network subscribers or a plurality of network subscribers are connected to a certain further input/output port of the network distributor which do not process the data-transmission protocol. In the cases described above, the configuration subscriber does not receive a query telegram from the network subscribers, since they cannot process the data-transmission protocol. The configuration subscriber may then determine that the network subscribers are not embodied as protocol-network subscribers.

If, as a result, the configuration subscriber then excludes the corresponding data line from further data communication, the configuration subscriber may block undesired data traffic from these network subscribers in this way, which is e.g. not relevant for the control task of the automation system. For example, the exclusion of further data communication may be the deactivation of the corresponding input/output port, so that addressing of the corresponding input/output port is no longer possible. Thereby, deactivation may be carried out in such a way that the corresponding input/output port is short-circuited using a switch function of the network distributor, which may be embodied as a switch. As a result, the telegrams are no longer output on the corresponding input/output port.

In this context, the defined time window is not shorter than the runtime of a query and/or configuration telegram, wherein the runtime comprises a transmission process via the data line, a run-through-delay time resulting from a hardware run-through time, i.e. the run-through time through the individual network subscriber, and a reception process via the data line. If the transmission of a query and/or configuration telegram is, for example, synchronous with the program cycle of the PLC in an EtherCAT network, the query and/or configuration telegram is transmitted with the cycle time of the PLC program. The runtime of the query and/or configuration telegram through the EtherCAT network is then less than the cycle time. The defined time window is therefore smaller than the cycle time, as well, so that a rapid response may be expected. Preferably, the machine or plant of the automation system is not yet in a control cycle when the network subscribers of the automation network are being determined.

According to another embodiment, the network-subscriber information comprises a network-subscriber identifier and a data-transmission rate of the protocol-network subscriber. The network-subscriber identifier may, for example, be a MAC address (MAC: Media Access Control) of the protocol-network subscriber. It is also conceivable that the network-subscriber identifier specifies a position of the protocol-network subscriber or a value that the protocol-network subscriber has if a chain of protocol-network subscribers is arranged on the respective data line. The data-transmission rate of the network-subscriber information in particular indicates to the neighboring network subscriber which amount of data the protocol-network subscriber may send over the corresponding data line during a certain unit of time. With a functionality of the protocol-network subscriber referred to as "transmitter" or "PHY" (PHY: Physical Layer) which may be implemented as a circuit a possible data-transmission rate to be set via the data line to a neighboring protocol-network subscriber may be ascertained.

If the data-transmission rates of the individual protocol-network subscribers and the network distributors are known, the data traffic may be embodied accordingly by telegrams in the control mode of the automation network. In this way, too, different data-transmission rates may also be made available for the data communication of the individual protocol-network subscribers in a chain or of the network subscribers in the automation network connected to the individual input/output ports of the network distributor in a chain to the further data line, as the further query telegrams may be output in parallel via the individual further input/output ports of the network distributor. Each further input/output port of the network distributor with connected further data lines may in an EtherCAT automation network be considered as an independent EtherCAT segment according to the above description.

In an EtherCAT automation network, EtherCAT segments with a first data-transfer rate, e.g. 100 Mbit/s, may be connected to EtherCAT segments with a second data-transfer rate, e.g. 1 Gbit/s and/or with EtherCAT segments with a third transfer rate, e.g. 10 Gbit/s. For example, an EK1400 coupler element by Beckhoff Automation GmbH & Co. KG may be used to convert the data-transfer rate from 1 Gbit/s to 100 Mbit/s and further coupler elements, e.g. the EK1100 type by Beckhoff Automation GmbH & Co. KG may be connected to it. If a telegram with the second data-transmission rate of 1 Gbit/s is e.g. received by the EK1400 coupler element and forwarded with the first data-transmission rate of 100 Mbit/s, the telegram may be forwarded without delay due to the higher receiving and transmitting speed. Preferably, the telegram is first received and buffered in a memory unit e.g. embodied as FIFO (FIFO: First In First Out) before the telegram is sent on at the first data-transmission rate.

If, in the opposite case, for example, a telegram is received with the first data-transmission rate of 100 Mbit/s and is further transmitted with the second data-transmission rate of 1 Gbit/s, the telegram, if it does not contain any length information, is received completely and buffered in the FIFO before it is further transmitted with the first data-transmission rate of 100 Mbit/s. If the telegram comprises a length information, it may be calculated at which point in time a sufficient amount of data in bytes has been received at which telegram transmission may already be started.

In addition to the described data-transmission rates, alternative data-transmission rates are conceivable, as well, e.g. 2.5 Gbit/s or 5 Gbit/s. The data-transmission rates described correspond to values selected as examples and may also be implemented in a different way.

In a further embodiment, the port information includes a port identifier and a data-transmission rate of the respective further input/output port of the network distributor. The port identifier may be a symbol or a value of the respective further input/output port to which a further data line is respectively connected. Input/output ports that may be used for further data communication are easier to identify using the port information. Also, the data-transfer rate for further data communication may be set quickly and easily using the port information. For example, a network distributor embodied as a so-called "branch" and/or as a "branch controller" enables simple administration and speed conversion and also offers the possibility of outputting further query telegrams to the EtherCAT segments connected via the individual further input/output ports in parallel. Depending on the connected network subscribers, the individual EtherCAT segments at the further input/output ports may be operated with the first data-transfer rate of 100 Mbit/s or with the second data-transfer rate of 1 Gbit/s. An increase in the data-transmission rate may lead to a higher data throughput. Due to the higher, second data-transmission rate at 1 Gbit/s (or the third data-transmission rate at 10 Gbit/s), the runtime of the query telegrams and/or the configuration telegram may be reduced in comparison to the first data-transmission rate and thus shorter cycle times may be achieved in control mode.

A protocol-network subscriber which processes the EtherCAT data-transmission protocol and is embodied to implement data communication with the second data-transmission rate of 1 Gbit/s and a network distributor which is embodied as a branch are advantageously embodied to implement data communication with both the second data-transmission rate of 1 Gbit/s and the first data-transmission rate of 100 Mbit/s. The same may apply to the configuration subscriber. For a data communication via the data line or the further data lines, the configuration subscriber and the network distributor embodied as a branch first check by the transmitter, for example, whether the protocol-network subscribers or network distributors may implement the second data-transmission rate which is higher than the first data-transmission rate. If this is not the case, i.e. if only the first data-transmission rate may be transmitted by the transmitter for data communication, the configuration subscriber and the branch each set the first data-transmission rate for data communication.

According to another embodiment, the query telegrams and the configuration telegram are embodied as telegrams with the underlying EtherCAT data-transmission protocol. In this manner, the configuration subscriber may advantageously determine protocol-network subscribers which process the EtherCAT data-transfer protocol. Said protocol-network subscribers may be intended to execute control tasks during operation of the automation network or to evaluate and/or provide data which are required by the configuration subscriber for the control task.

A configuration subscriber and a network distributor are furthermore proposed which are embodied to carry out the method of detecting network subscribers. With the configuration subscriber and the network distributor e.g. embodied as a branch, the compatibility of the protocol-network subscribers and the network distributors in the automation system may be improved. In particular, the network distributor embodied as a branch may be the speed converter for different data-transmission rates in the automation network. The telegrams received by the branch at the second data-transmission rate and sent on at the first data-transmission rate may be received by the branch, buffered in the FIFO and forwarded. For the telegrams received by the branch with the first data-transmission rate, it is necessary to first receive and buffer them completely if the telegrams do not contain any length information. If the telegrams have a length information, they do not have to be received completely, but the time may be determined at which the telegrams may already be forwarded prior to complete receipt.

The branch may comprise input/output ports which may convert the second data-transmission rate of 1 Gbit/s and/or the third data-transmission rate of 10 Gbit/s on the corresponding further data lines. Alternatively, other input/output ports having different data-transfer rates are conceivable, as well. This may create the basis for new areas of application where up to now capacity limits have been reached. For example, complex applications, high-performance machines and applications that generally produce large amounts of data may easily be integrated into the automation network, e.g. due to the exact synchronization of many coupled axes that are moved dynamically.

The advantageous embodiments and further embodiments of the invention described above and/or indicated in the sub-claims may be applied individually or in any combination with each other, except, for example, in cases of clear dependencies or incompatible alternatives.

Figure 1:
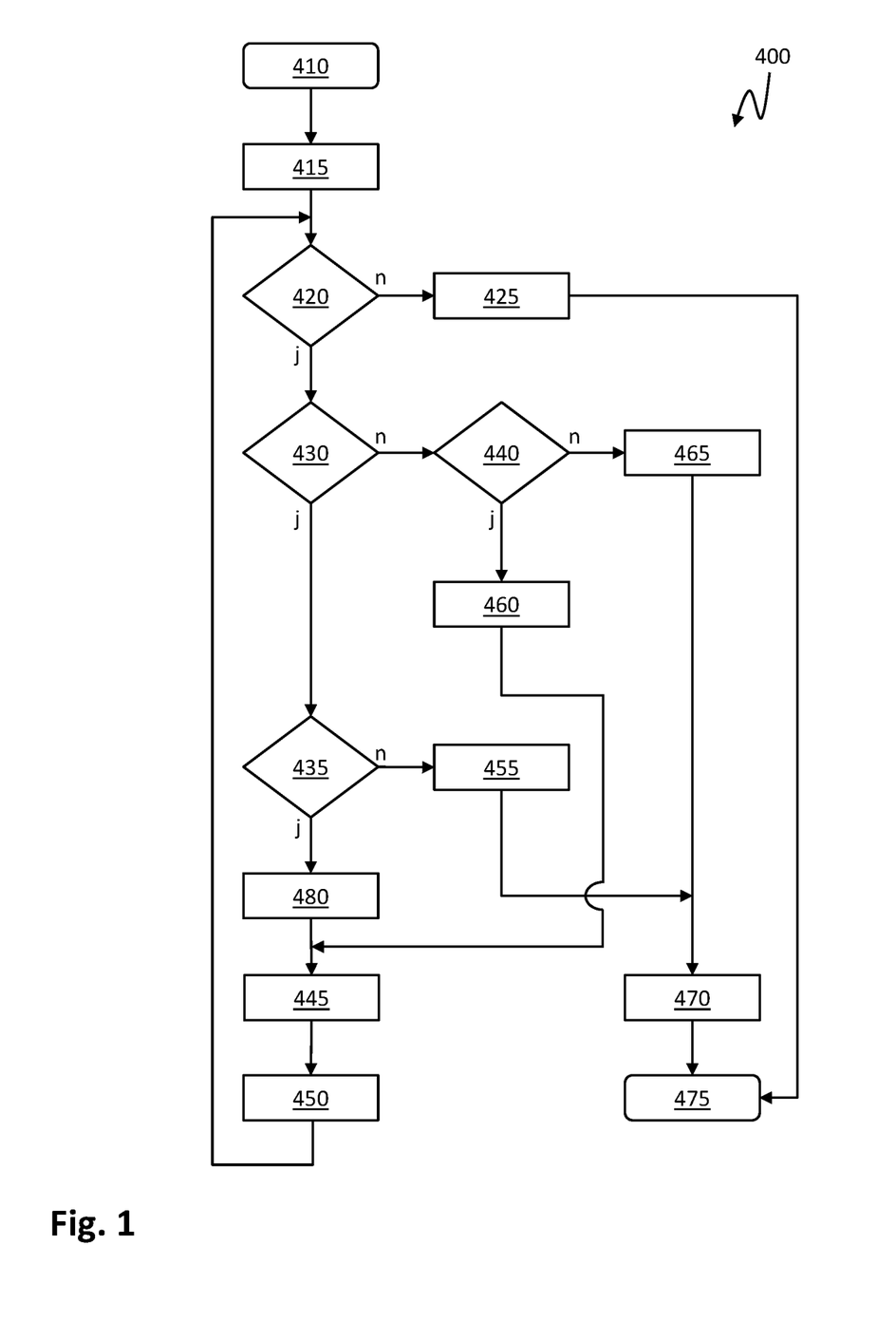
FIG. 1 shows a schematic sequence of a method of detecting network subscribers in an automation network by query telegrams.

FIG. 1 shows a flow chart 400 of a method of detecting network subscribers in an automation network 100 by query telegrams. At the start 410 of the method is a configuration subscriber 105. In a first step 415, the configuration subscriber 105 sends a query telegram to a network subscriber connected via the data line. In addition, the configuration subscriber 105 defines a time window in which the configuration subscriber 105 expects the query telegram to return via the data line. Here, the configuration subscriber 105 may define the time window in such a way that the time window is not smaller than a runtime of the query telegram, wherein the runtime comprises a transmission process via the data line, a processing delay time resulting from a hardware processing time, i.e. the processing time through the individual network subscriber, and a receipt process via the data line. In addition, the configuration subscriber 105 may define the time window to be smaller than the cycle time if, for example, the query telegram is sent with the cycle time of the PLC program, since the runtime of the query telegram is then smaller than the cycle time.

If the network subscriber connected to the data line that receives the query telegram is embodied as a protocol-network subscriber, e.g. as a slave network subscriber, the protocol-network subscriber reads the data addressed to it in the query telegram and places the output data of the protocol-network subscriber, for example in the form of network-subscriber information, into the query telegram. This may take the form of an active entry of the network-subscriber information into the query telegram or as reading out the network-subscriber information located in a certain addressed memory area of the protocol-network subscriber and transmitting the read-out network-subscriber information to the configuration subscriber.

If the protocol-network subscriber recognizes that no subsequent network subscriber is connected to a further data line than the receiving data line, the protocol-network subscriber returns the query telegram to the configuration subscriber via the receiving data line, otherwise the protocol-network subscriber sends the query telegram to the subsequent network subscriber connected to the further data line. If, for example, several protocol-network subscribers are connected to the data line in a chain, the last protocol-network subscriber in the chain may detect an unused input/output port on the protocol-network subscriber to which no subsequent protocol-network subscriber is connected. For example, an unused input/output port of the protocol-network subscriber, if it is embodied as an EtherCAT-network subscriber, may be short-circuited and thus deactivated by a switch function of the protocol-network subscriber, which may be embodied as a switch. If the data line, as seen from the configuration subscriber 105, for example a TX line for sending the query telegram and an RX line for receiving the query telegram (TX: transmitter, RX: receiver), the query telegram is returned to the configuration subscriber via the RX line from the last EtherCAT-network subscriber in the chain via the short-circuited, unused input/output port of the EtherCAT-network subscriber connected to the TX line.

The network-subscriber information may include a network-subscriber identifier as well as a data-transmission rate of the protocol-network subscriber. The network-subscriber information and the data-transfer rate may each form an entry in a memory unit of the protocol-network subscriber. For example, the network-subscriber identifier may be in the form of a MAC address (MAC: Multimedia Access Control) and uniquely identify the protocol-network subscriber as such in the automation network 100. It is also conceivable that the network-subscriber identifier is in the form of a position specification of the protocol-network subscriber, if several protocol-network subscribers are arranged in a chain. In addition, alternative identification possibilities of the protocol-network subscriber are possible by the network-subscriber identifier using a value, a symbol, etc.

The data-transmission rate of the network-subscriber information indicates the amount of data the protocol-network subscriber may send over the data line within a certain time unit. This may be the first data-transmission rate with 100 Mbit/s or the second data-transmission rate of 1 Gbit/s or the third data-transmission rate of 10 Gbit/s, wherein the protocol-network subscriber which is embodied to implement the second data-transmission rate of 1 Gbit/s or the third data-transmission rate of 10 Gbit/s for data communication is also able to set the first data-transmission rate of 100 Mbit/s for data communication. In addition to the data-transmission rates shown, alternative data-transmission rates of, for example, 2.5 Gbit/s or 5 Gbit/s are possible, as well. The data-transmission rates explained correspond to values selected as examples and may deviate from them. The data-transmission rate to be set may be checked with the aid of a so-called "transmitter", a "PHY" (PHY: physical layer), which may be implemented as a circuit in the protocol-network subscriber. In a chain of protocol-network subscribers connected to the data line, the configuration subscriber 105 may set the data-transmission rate for all protocol-network subscribers uniformly to the first data-transmission rate for data communication, if, for example, a protocol-network subscriber is connected to the data line in the chain which is only embodied for data communication with the first data-transmission rate. The configuration subscriber 105 may e.g. set this by a configuration telegram for the individual protocol-network subscribers.

If a network distributor connected to the data line has received the query telegram of the configuration subscriber 105 on a first input/output port, the network distributor enters port information on the other input/output ports of the network distributor to which further data lines are connected into the query telegram and returns the query telegram to the configuration subscriber 105 via the receiving data line. The port information may include a port identifier and a data-transmission rate for which the respective further input/output port for data communication is embodied. In addition, the network distributor may also enter a network-distributor identifier, which, like the network-subscriber identifier, may be a MAC address, a value, a symbol, etc., into the query telegram. The port identifier may be a symbol or a value of the respective further input/output port to which a further data line is connected. In addition to the further input/output ports to which further data lines are connected, the network distributor may also have input/output ports to which no further data line is respectively connected. These input/output ports may be short-circuited and thus deactivated by a switch functionality of the network distributor, which is embodied as a switch, in analogy to the description of the input/output ports of a protocol-network subscriber.

Furthermore, it is conceivable that further input/output ports of the network distributor may be specifically deactivated if, for example, there is a communication fault on a data line in the automation network. By manually deactivating step-by-step, i.e. short-circuiting the individual further input/output ports of the network distributor by the switch, it is possible to check on which further input/output ports the telegrams on the further input/output ports are received back and on which further input/output port they are not and the communication disturbance is thus localized. This provides an improved diagnostic possibility in case of disturbances occurring in the automation network.

The port identifier and the data-transmission rate of the individual further input/output ports of the network distributor as well as the network-distributor identifier may each form an entry in the memory unit of the network distributor. In addition to entering this information in the query telegram, the network distributor may also be embodied to read the memory areas addressed by the query telegram from the memory unit of the network distributor and to return the read information to the configuration subscriber 105 via the receiving data line.

If the data-transmission rates of the individual further input/output ports of the network distributor are known, the data traffic may be configured to this effect by telegrams in the control mode of the automation network. Different data-transmission rates for data communication may also be realized for the individual further input/output ports and the network subscribers connected to the other data lines, depending on the configuration of the connected network subscribers. The individual further query telegrams may be output in parallel via the respective further input/output ports of the network distributor via the further data lines in order to reduce the processing time of the further query telegrams and enable faster data communication. Each further input/output port of the network distributor with connected further data lines and protocol-network subscribers and/or network distributors may be regarded as an independent EtherCAT segment in an EtherCAT automation network, for example according to the above explanation.

Accordingly, in an EtherCAT automation network, EtherCAT segments that are embodied for data communication at the first data-transfer rate of 100 Mbit/s may be connected to EtherCAT segments that are embodied for data communication at the second data-transfer rate of 1 Gbit/s and/or to EtherCAT segments that are embodied for data communication at the third data-transfer rate of 10 Gbit/s. For example, a network distributor embodied as a "branch" by Beckhoff Automation GmbH & Co. KG, a speed conversion of the data communication from the second data-transmission rate of 1 Gbit/s to the first data-transmission rate of 100 Mbit/s may be carried out. This may be realized, for example, if protocol-network subscribers connected to the respective input/output port of the network distributor in an EtherCAT segment are only embodied for data communication at the first data-transfer rate or if a protocol-network subscriber is arranged in the EtherCAT segment that may only transfer data at the first data-transfer rate. However, in the mentioned case not all EtherCAT segments connected to the further input/output ports of the network distributor need to be operated with the first data-transfer rate for data communication.

For data communication, the network distributor and the configuration subscriber 105 check with the aid of the transmitter whether it is possible to set the second data-transfer rate and/or the third data-transfer rate between the protocol-network subscribers and/or further network distributors connected to the data line, and if not, set the first, lower data-transfer rate.

So that the network distributor may output further query telegrams via the individual further input/output ports of the network distributor in order to be able to specifically detect the network subscribers connected to the further input/output ports via further data lines, which may include protocol subscribers and network distributors, the network distributor requires an assignment possibility of the further query telegrams to the individual further input/output ports of the network distributor. This assignment possibility may form the respective routing information. This may be an input/output port address, a segment address in the case of an EtherCAT network, a value, a symbol, etc. and may be based on the port information. Additionally, it is conceivable that the port information includes the respective routing information. The configuration subscriber 105 may, for example, preset the routing information in the network distributor.

In addition, the configuration subscriber 105 may create the routing information on the basis of the port information transmitted by the network distributor in the query telegram and assign the routing information to the individual further input/output ports of the network distributor to which the further data lines are connected by a configuration telegram, for example as an entry in the storage unit of the network distributor. The further query telegrams may then each contain the routing information and, on receipt of the further query telegrams on a first input/output port of the network distributor, may be compared with the entry of the routing information in the memory unit of the network distributor in order to determine the further input/output port of the network distributor assigned to the routing information in the memory unit via which the further query telegrams are output. In an EtherCAT network, the query telegrams and the configuration telegram are embodied as EtherCAT telegrams, i.e. with underlying EtherCAT data-transfer protocol, in order to be able to detect and configure the EtherCAT protocol-network subscribers and network distributors that process the EtherCAT data-transfer protocol in the EtherCAT network.

The configuration subscriber 105 checks by a first branch 420 in FIG. 1 whether the configuration subscriber 105 has received the query telegram sent over the data line or the query telegram sent over the further data line or, from the perspective of the network subscriber, the query telegram received over the receiving data line from the network subscriber within the specified time window. If this is not the case (marked as n in FIG. 1, which will not be discussed in the following), the configuration subscriber 105 assumes that the network subscriber is not a protocol-network subscriber which processes the specific data-transfer protocol, for example the EtherCAT data-transfer protocol. However, only EtherCAT-network subscribers or, respectively, network distributors that support the EtherCAT data-transfer protocol are relevant for the control operation of the EtherCAT network. Therefore, in a second step 425 in FIG. 1, configuration subscriber 105 excludes the data line or the further data line or the receiving data line, via which the configuration subscriber 105 has issued the query telegram but has not received it back within the specified time window, from further data communication. The configuration subscriber 105 thus no longer sends a further query telegram via the corresponding data line or via the further data line or via the receiving data line and short-circuits the corresponding input/output port or the corresponding further input/output port with the help of the switch. In FIG. 1, the end 475 is thus reached.

If, on the other hand, the configuration subscriber 105 again receives the query telegram from the network subscriber via the data line or the further data line or the receiving data line within the specified time window (marked j in FIG. 1, which will not be dealt with in the following), the configuration subscriber 105 checks by a second branch 430 whether the received query telegram contains a plurality of network-subscriber information. If this is not the case, the configuration subscriber 105 uses a fourth branch 440 to check whether the received query telegram has port information. If the received query telegram does not contain a plurality of network-subscriber information and no port information, either, the configuration subscriber 105 recognizes in an eighth step 465 an individual protocol-network subscriber on the basis of an individual network-subscriber information in the received query telegram. As the protocol-network subscriber does not enter any port information, the configuration subscriber 105 knows that the query telegram has been processed by a protocol-network subscriber. If necessary, the configuration subscriber 105 may still configure the protocol-network subscriber. Based on the received network-subscriber information, the protocol-network subscriber may be addressed in a ninth step 470 for the conventional telegram traffic in control mode of the automation network 100. The method for detecting the protocol-network subscribers thus finally arrives at the end 475.

If the configuration subscriber 105 in the second branch 430 may detect a plurality of network-subscriber information when evaluating the received query telegram, the configuration subscriber 105 checks by a third branch 435 whether the received query telegram also has port information in addition to the plurality of network-subscriber information. If the received query telegram does not contain any port information, the configuration subscriber 105 detects a plurality of protocol-network subscribers in a sixth step 455 based on the plurality of network-subscriber information contained in the query telegram arranged in a chain and connected to the data line. Finally, the detected multiple protocol-network subscribers may be addressed using the network-subscriber information in the ninth step 470 for conventional telegram traffic in control mode of the automation network 100.

If the configuration subscriber 105 in the third branch 435 may determine at least one port information in the received query telegram in addition to the plurality of network-subscriber information, the configuration subscriber 105 in a third step 480 recognizes at least one network distributor and a plurality of protocol-network subscribers. In a fourth step 445, the configuration subscriber 105 may create the routing information for the individual input/output ports of the network distributor to which further data lines are connected on the basis of the port information and assign the routing information to the individual input/output ports of the network distributor. In a fifth step 450, further query telegrams comprising the routing information may then be output by the configuration subscriber 105 via the further input/output port of the network distributor assigned to the routing information via the network subscribers connected to the further data lines in order to be able to record these. The configuration subscriber 105 may output the further query telegrams in parallel via the individual further input/output ports of the network distributor.

In this context, the configuration subscriber 105 may define further time windows for the additional query telegrams in which the configuration subscriber 105 expects the additional query telegrams to return, or use the already defined time window for the additional query telegrams.

For the further query telegrams, the configuration subscriber 105 in turn checks by the first branch 420 whether configuration subscriber 105 has received the further query telegrams within the defined time window. In this connection, the configuration subscriber 105 may also exclude each of the further data lines connected via the individual further input/output ports of the network distributor via which the configuration subscriber 105 has not received a further query telegram within the defined time window separately from further data communication by deactivating the respective further input/output port of the network distributor. The further test steps are then analogous to the above description, wherein a separate test is performed for each individual query telegram by the configuration subscriber 105 in order to be able to detect the individual network subscribers.

If the received query telegram in the fourth branch 440 does not contain a plurality of network-subscriber information but a port information, the configuration subscriber 105 recognizes a network distributor as such in a seventh step 460 on the basis of the port information. The configuration subscriber 105 may then create the routing information for the individual input/output ports of the network distributor on the basis of the port information and assign it to the individual input/output ports of the network distributor in the fourth step 445. Eventually, the configuration subscriber 105 may continue with the fifth step 450 and check for the further query telegrams by the first branch 420 whether the configuration subscriber 105 has received the further query telegrams within the defined time window (cf. above explanation on deactivating an input/output port of the network distributor). The configuration subscriber 105 continues in flow chart 400 of FIG. 1 as described above until the configuration subscriber 105 has detected and identified all network subscribers in the automation network 100 as such and the configuration subscriber cannot determine any further network distributors.

Figure 2:
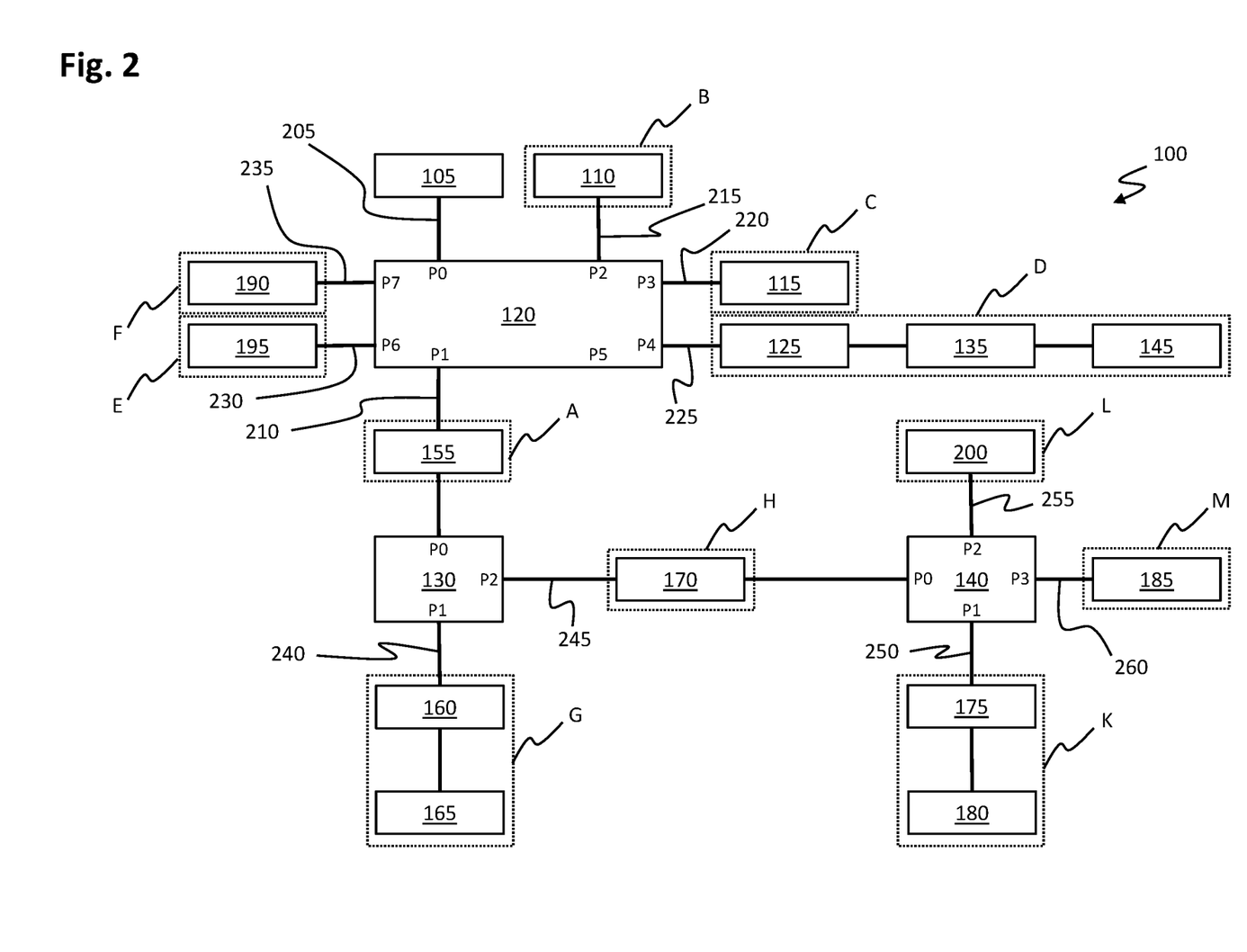
FIG. 2 a schematic structure of the automation network comprising the network subscribers determined on the basis of the method shown in FIG. 1.

FIG. 2 shows a schematic structure of the automation network 100, the network subscribers of which are determined using the procedure shown in FIG. 1. The configuration subscriber 105 which e.g. is embodied as an EtherCAT master network subscriber is connected to a first input/output port P0 of the first network distributor 120 via a first data line 205. The configuration subscriber 105 sends a query telegram to the first input/output port P0 of the first network distributor 120 via the first data line 205. Furthermore, the configuration subscriber 105 defines the time window in which the configuration subscriber 105 expects the query telegram to return via the first data line 205.

The first network distributor 120 enters the port information for the further input/output ports of the first network distributor 120 to which further data lines are connected into the query telegram. For example, the port information (port identifier and data-transmission rate) comprises a second input/output port P1 of the first network distributor 120 to which a second data line 210 is connected, the second input/output port P1 being embodied to convert the second data-transmission rate of 1 Gbit/s for data communication on the second data line 210, a third input/output port P2 of the first network distributor 120 to which a third data line 215 is connected, wherein the third input/output port P2 is embodied to convert the second data-transmission rate of 1 Gbit/s for data communication on the third data line 215, a fourth input/output port P3 of the first network distributor 120 to which a fourth data line 220 is connected, wherein the fourth input/output port P3 is embodied to convert the first data-transmission rate of 100 Mbit/s for data communication on the fourth data line 220, a fifth input/output port P4 of the first network distributor 120 to which a fifth data line 225 is connected, the fifth input/output port P4 being embodied to convert the second data-transmission rate of 1 Gbit/s for data communication on the fifth data line 225, a seventh input/output port P6 of the first network distributor 120, to which a sixth data line 230 is connected, the seventh input/output port P6 being embodied to convert the second data-transmission rate of 1 Gbit/s for data communication on the sixth data line 230, and an eighth input/output port P7 of the first network distributor 120 to which a seventh data line 235 is connected, wherein the eighth input/output port P7 is embodied to convert the first data-transmission rate of 100 Mbit/s for data communication on the seventh data line 235. For example, no further data line may be connected to a sixth input/output port P5 and the sixth input/output port P5 may be short-circuited with the switch of the first network distributor 120.

The port identifier as well as the data-transmission rate of the individual first to eighth input/output ports (P0 to P7) of the first network distributor 120 have been randomly selected arbitrarily and could have been assigned in a different way. An exemplary selection of the port identifier and the data-transmission rate of the individual input/output ports is made for subsequent network distributors in automation network 100, as well. In this case, it is not pointed out again that this may also be done in a different way.

The first network distributor 120 returns the query telegram comprising the above information which is e.g. contained in the memory unit of the first network distributor 120 to the configuration subscriber 105 within the specified time frame via the receiving and therefore first data line 205. Due to the port information contained in the returned query telegram, the configuration subscriber 105 is able to recognize the first network distributor 120 as a network distributor. The configuration subscriber 105 then e.g. sends a configuration telegram to assign a routing information to the individual further input/output ports of the first network distributor 120 to which further data lines are connected, on the basis of the port information, so that the first network distributor 120 respectively outputs the further query telegrams on the further input/output port of the first network distributor 120 assigned to the routing information. The routing information may be embodied according to the above description or identical to the port information.

For example, the configuration subscriber 105 assigns the routing information as segment address A to the second input/output port P1 of the first network distributor 120, as segment address B to the third input/output port P2 of the first network distributor 120, and as segment address C to the fourth input/output port P3 of the first network distributor 120, as segment address D to the fifth input/output port P4 of the first network distributor 120, as segment address E to the seventh input/output port P6 of the first network distributor 120, and as segment address F to the eighth input/output port P7 of the first network distributor 120. Subsequently, it is assumed that the individual network subscribers connected to the further data lines respectively return the further query telegrams to the configuration subscriber 105 within the defined time window. The network subscribers which may be addressed with the segment addresses A to F are shown in FIG. 2, wherein the second network distributor 130 may also receive a further query telegram having the segment address A via the first input/output port P0 of the second network distributor 130. The segment addresses have been exemplarily selected and may also differ from the selected description. The segment addresses A to F in FIG. 2 may also represent segments in the automation network 100 which may differ from the above-mentioned embodiment of the EtherCAT segments, since the actual structuring of the automation network 100, i.e. the subdivision of the automation network 100 into the above-described EtherCAT segments, may e.g. only be implemented after the network subscribers have been completely detected in the automation network 100. In this context, new routing information in the form of different segment addresses may be assigned to individual input/output ports of the first network distributor 120, for example, to address the differently subdivided EtherCAT segments.

The configuration subscriber 105 then sends further query telegrams, each with the routing information, via the first data line 205 to the first input/output port P0 of the first network distributor 120, wherein the first network distributor 120 outputs the further query telegrams in parallel via the individual second to eighth input/output ports P1 to P7 of the first network distributor 120 to the further data lines. The query telegram comprising the routing information, the segment address A, is output by the first network distributor 120, for example, due to the assignment of the routing information, the segment address A, to the second input/output port P1 of the first network distributor 120, via the second input/output port P1 of the first network distributor 120 on the second data line 210. The query telegram having the routing information, the segment address B, is e.g. output by the first network distributor 120 due to the assignment of the routing information, the segment address B, to the third input/output port P2 of the first network distributor 120, via the third input/output port P2 of the first network distributor 120 on the third data line 215. The query telegram with the routing information, the segment address C, is e.g. output by the first network distributor 120 due to the assignment of the routing information, the segment address C, to the fourth input/output port P3 of the first network distributor 120, via the fourth input/output port P3 of the first network distributor 120 on the fourth data line 220. For example, the query telegram with the routing information, the segment address C having the second data-transmission rate of 1 Gbit/s may have been sent to the first network distributor 120 by the configuration subscriber 105 and may first have been buffered by the first network distributor 120 in the FIFO of the first network distributor 120 before the first network distributor 120 outputs the query telegram having the first data-transmission rate of 100 Mbit/s via the fourth input/output port P3 of the first network distributor 120. In this context, the query telegram does not have to have been completely received in order to be further output by the first network distributor 120 on the fourth input/output port P3 of the first network distributor 120.

The query telegram with the routing information, the segment address D, is output by the first network distributor 120, for example, due to the assignment of the routing information, the segment address D, to the fifth input/output port P4 of the first network distributor 120 via the fifth input/output port P4 of the first network distributor 120 on the fifth data line 225. The query telegram with the routing information, the segment address E, is output by the first network distributor 120, for example, due to the assignment of the routing information, the segment address E, to the seventh input/output port P6 of the first network distributor 120 via the seventh input/output port P6 of the first network distributor 120 on the sixth data line 230. The query telegram with the routing information, the segment address F, is output by the first network distributor 120, for example, due to the assignment of the routing information, the segment address F, to the eighth input/output port P7 of the first network distributor 120 via the eighth input/output port P7 of the first network distributor 120 on the seventh data line 235.

The fifth protocol-network subscriber 155 connected to the second data line 210 enters the network-subscriber information into the query telegram and sends the query telegram to a second network distributor 130 which is subsequently connected to the second data line 210. For example, the fifth protocol-network subscriber 155 is embodied as an EtherCAT-network subscriber, which is embodied to implement data communication at the second data-transmission rate of 1 Gbit/s. The second network distributor 130 enters the port information into the query telegram, i.e. that further data lines are connected to the second input/output port P1 of the second network distributor 130 and to the third input/output port P2 of the second network distributor 130, and returns the query telegram to the configuration subscriber via the receiving second data line 210 and the first data line 205 to the configuration subscriber 105.

A master-network subscriber 110 connected to the third input/output port P2 of the first network distributor 120 via the third data line 215 enters its network-subscriber information into the query telegram and returns the query telegram to the configuration subscriber 105 via the receiving and thus third data line 215 and the first data line 205.

A first protocol-network subscriber 115 connected to the fourth input/output port P3 of the first network distributor 120 via the fourth data line 220 enters its network-subscriber information into the query telegram and sends the query telegram back to the configuration subscriber 105 via the fourth data line 220 and the first data line 205. For example, the first protocol-network subscriber 115 may be used as coupler element EK1100 by Beckhoff Automation GmbH & Co. KG and be embodied for the connection of EtherCAT protocol-network subscribers via the individual terminals. The first protocol-network subscriber 115 may thereby be embodied for data communication at the first data-transfer rate of 100 Mbit/s. The first protocol-network subscriber 115 sends the query telegram with the first data-transfer rate via the fourth data line 220 to the fourth input/output port P3 of the first network distributor 120. The first network distributor 120 receives the query telegram completely and buffers the query telegram in its FIFO before the first network distributor 120 sends the query telegram with the second data-transfer rate of 1 Gbit/s via the first input/output port P0 of the first network distributor 120 and the first data line 205 to the configuration subscriber 105. It has been assumed here that the query telegram does not contain any length information.

A second protocol-network subscriber 125 connected to the fifth input/output port P4 of the first network distributor 120 via the fifth data line 225 enters the network-subscriber information into the query telegram and forwards the query telegram to a subsequent third protocol-network subscriber 135 via the fifth data line 225. The third protocol-network subscriber 135 enters the network-subscriber information into the query telegram and forwards the query telegram via the fifth data line 225 to a subsequent fourth protocol-network subscriber 145. As explained above, the fourth protocol-network subscriber 145 recognizes that the fourth protocol-network subscriber 145 is the last protocol-network subscriber in the chain, and after entering the network-subscriber information returns the query telegram to the configuration subscriber 105 via the receiving fifth data line 225 and the first data line 205. For example, the second protocol-network subscriber 125 is embodied as a coupler element, the third protocol-network subscriber 135 and the fourth protocol-network subscriber 145 are each embodied as a so-called "simple branches", wherein the "simple branches" include a routing functionality in addition to the two EtherCAT input/output ports, so that the "simple branches" also process other data-transfer protocols in addition to the EtherCAT data-transfer protocol, for example TCP/IP, Ethernet, etc. For example, the second protocol-network subscriber 125 may be embodied for data communication with the second data-transfer rate of 1 Gbit/s, and the third protocol-network subscriber 135 and the fourth protocol-network subscriber 145 may also be embodied for the second data-transfer rate.

For example, the configuration subscriber 105 neither receives the query telegram via the sixth data line 230 nor via the seventh data line 235 within the defined time window. A second network subscriber 195 is connected to the sixth data line 230 and a first network subscriber 190 to the seventh data line 235. These are each embodied as Ethernet network subscribers and therefore do not process the Ether-CAT data-transmission protocol on which the respective query telegrams are based, and do not return the query telegram to configuration subscriber 105. The configuration subscriber 105 may then exclude the seventh and eighth input/output ports P6, P7 of the first network distributor 120 and the sixth and seventh data lines 230, 235 connected to them from further data communication using a further configuration telegram. For example, the configuration subscriber 105 may deactivate the seventh and eighth input/output ports P6, P7 of the first network distributor 120, i.e. short-circuit them using the switch of the first network distributor 120 so that no more telegrams are output via the seventh and eighth input/output port P6, P7 of the first network distributor 120, but are returned to the configuration subscriber 105.

The configuration subscriber 105 moreover sends a configuration telegram to the second network distributor 130 in order to assign routing information to each of the other second and third input/output ports P1, P2 of the second network distributor 130. For example, the configuration subscriber 105 assigns the routing information as segment address G to the second input/output port P1 of the second network distributor 130 and assigns the routing information as segment address H to the third input/output port P2 of the second network distributor 130. The configuration subscriber 105 then sends further query telegrams comprising the routing information to the second network distributor 130 via the first and second data line 205, 210 which the second network distributor 130 outputs in parallel via the second input/output port P1 of the second network distributor 130 assigned to the routing information and the third input/output port P2 of the second network distributor 130 assigned to the routing information. The query telegram with the routing information, the segment address G, is output via the second input/output port P1 of the second network distributor 130 from the second network distributor 130 via an eighth data line 240 to a sixth protocol-network subscriber 160. The network subscribers which may be addressed with the segment addresses G to H are shown in FIG. 2, wherein the third network distributor 140 may also receive a further query telegram with the segment address H via the first input/output port P0 of the third network distributor 140. The segment addresses have been selected as examples and may also differ from the selected description. The segment addresses G to H in FIG. 2 may also represent segments in the automation network 100 which may differ from the above-mentioned embodiment of the EtherCAT segments, since the actual structuring of the automation network 100, i.e. the subdivision of the automation network 100 into the above-described EtherCAT segments may e.g. only be implemented after the network subscribers have been completely detected in the automation network 100. In this context, e.g. new routing information in the form of different segment addresses may be assigned to individual input/output ports of the first network distributor 120 to address the differently subdivided EtherCAT segments.

The sixth protocol-network subscriber enters the network-subscriber information into the query telegram and sends the query telegram to a subsequent seventh protocol-network subscriber 165 via the eighth data line 240. As explained above, the seventh protocol-network subscriber 165 recognizes that the seventh protocol-network subscriber 165 is the last protocol-network subscriber in the chain of protocol-network subscribers connected to the eighth data line 240 and returns the query telegram to the configuration subscriber 105 via the eighth data line 240, the second data line 210 and the first data line 205. For example, the sixth protocol-network subscriber 160 is embodied as "simple branch", as explained above, and the seventh protocol-network subscriber 165 is embodied as coupler element. The sixth protocol-network subscriber 160 and the seventh protocol-network subscriber 165 may e.g. be embodied for data communication with the second data-transmission rate of 1 Gbit/s.

An eighth protocol-network subscriber 170 which is connected to a ninth data line 245 at the third input/output port P2 of the second network distributor 130 receives the query telegram and enters the network-subscriber information into the query telegram before the eighth protocol-network subscriber 170 sends the query telegram to a third network distributor 140, which is subsequently connected to the ninth data line 245. The third network distributor 140 receives the query telegram on the first input/output port P0 of the third network distributor 140 and enters the port information of the individual further input/output ports of the third network distributor 140 to which further data lines are connected. The port information (port identifier and data-transmission rate of the individual input/output ports) comprises a second input/output port P1 of the third network distributor 140, wherein the second input/output port P1 of the third network distributor 140 is embodied to implement data communication at the second data-transmission rate of 1 Gbit/s, a third input/output port P2 of the third network distributor 140, wherein the third input/output port P2 of the third network distributor 140 is embodied to implement data communication at the second data-transmission rate of 1 Gbit/s, and a fourth input/output port P4 of the third network distributor 140, wherein the fourth input/output port P4 of the third network distributor 140 is embodied to implement data communication at the first data-transmission rate of 100 Mbit/s.

Subsequently, the third network distributor 140 returns the query telegram to the configuration subscriber 105 via the ninth data line 245, the second data line 210 and the first data line 205.

For example, the eighth protocol-network subscriber 170 is embodied as an EtherCAT-network subscriber to convert the second data-transmission rate of 1 Gbit/s for data communication, and the first to third network distributors 120, 130, 140 are embodied as branches.

In order to assign the individual additional second to fourth input/output ports P1 to P3 of the third network distributor 140 to the respective routing information, the configuration subscriber 105 uses a configuration telegram analogous to the above description and creates the routing information on the basis of the port information of the third network distributor 140. For example, the configuration subscriber 105 assigns the routing information to the second input/output port P1 of the third network distributor 140 as segment address K, to the third input/output port P2 of the third network distributor 140 as segment address L, and to the fourth input/output port P3 of the third network distributor 140 as segment address M. The further query telegrams which the configuration subscriber 105 sends to the third network distributor 140 and which are output by the third network distributor 140 via the input/output port assigned to the routing information each have the routing information with the segment addresses K, L and M and are output in parallel via the assigned input/output ports of the third network distributor 140. For example, the query telegram with the routing information, segment address M, is received by the third network distributor 140 at the same data-transmission rate and further output as described above in connection with the first network distributor 120 and the query telegram with the routing information, segment address C.

The network subscribers which may be addressed with the segment addresses K to M are shown in FIG. 2. The segment addresses have been selected as examples and may also differ from the selected description. The segment addresses K to M in FIG. 2 may also represent segments in the automation network 100 which may differ from the above-mentioned embodiment of the EtherCAT segments, since the actual structuring of the automation network 100, i.e. the subdivision of the automation network 100 into the above-described EtherCAT segments may e.g. only be implemented after the network subscribers have been completely detected in the automation network 100. In this context, new routing information in the form of different segment addresses may be assigned to individual input/output ports of the first network distributor 120, for example, to address the differently subdivided EtherCAT segments.

The query telegram with the routing information, the segment address K, is output by the third network distributor 140 on the second input/output port P1 of the third network distributor 140 assigned to the routing information via a tenth data line 250. A ninth protocol-network subscriber 175 connected to the tenth data line 250 enters the network-subscriber information into the query telegram and sends the query telegram to a tenth protocol-network subscriber 180 which is subsequently connected to the tenth data line 250. The tenth protocol-network subscriber 180 also enters the network-subscriber information in the query telegram and recognizes that it is the last protocol-network subscriber in the chain and returns the query telegram to the configuration subscriber 105 via the tenth data line 250, the ninth data line 245, the second data line 210 and the first data line 205. For example, the ninth protocol-network subscriber 175 is embodied as coupler element and the tenth protocol-network subscriber 180 as "simple branch", as described above.

A third network subscriber 200 connected to an eleventh data line 255 via the third input/output port P2 to the third network distributor 140 may, for example, be embodied as an Ethernet switch and not process the EtherCAT data-transmission protocol on which the query telegram with the routing information, the segment address L, is based. If the third network subscriber 200, which is embodied as an Ethernet switch, does not process the EtherCAT data-transfer protocol, the Ethernet switch does not return the query telegram to configuration subscriber 105. If the configuration subscriber 105 does not receive the query telegram from the Ethernet switch, the third network subscriber 200, within the specified time window, the configuration subscriber 105 may e.g. use a configuration telegram to the third network distributor 140 to set that no further telegram is sent via the third input/output port P2 of the third network distributor 140 and the eleventh data line 255 connected to it.

An eleventh protocol-network subscriber 185 connected to a twelfth data line 260 via the fourth input/output port P3 to the third network distributor 140 may receive the query telegram comprising the routing information, the segment address M via the twelfth data line 260 and enter the network-subscriber information into the query telegram, on the basis of which the configuration subscriber 105 recognizes the eleventh protocol-network subscriber 185. For example, the eleventh protocol-network subscriber 185 is embodied as an EtherCAT protocol-network subscriber, which is embodied to implement data communication with the first data-transmission rate of 100 Mbit/s. The eleventh protocol-network subscriber 185 detects that subsequently no further network subscriber is connected to the twelfth data line 260 and returns the query telegram to configuration subscriber 105 via the twelfth data line 260, the ninth data line 245, the second data line 210 and the first data line 205. For example, the query telegram from the eleventh protocol-network subscriber 185 is received and further output by the third network distributor 140 at the same data-transmission rate as described above in connection with the first network distributor 120 and the query telegram from the first protocol-network subscriber 115.

The configuration subscriber 105 has thus completely detected the network subscribers of the automation network 100 and may configure the network subscribers, e.g. set the data-transmission rate in a chain of protocol-network subscribers connected to a further input/output port of the respective network distributor to the first data-transmission rate if protocol-network subscribers are arranged in the chain or in the segment which may convert both the first and the second data-transmission rate and another protocol-network subscriber is only embodied to convert the first data-transmission rate. For example, the configuration subscriber 105 may set the data-transmission rate for the chain of protocol-network subscribers to the first data-transmission rate. Another advantage is that the configuration subscriber 105 may perform a central configuration of the protocol-network subscribers and network distributors in automation network 100.

The individual input/output ports of the network distributors, on which the network distributors have each received the query telegram from the configuration subscriber 105, may be stored by the respective network distributor in the memory unit of the network distributors in order to use the first input/output port P0 of the corresponding network distributor assigned to the configuration subscriber 105 as the output port when the query telegrams are returned from the respective network distributors.

Furthermore, it is conceivable that the first to third network distributors 120, 130, 140 fragment the query telegrams returned from the protocol-network subscribers via the individual further input/output ports in order to avoid a collision of the query telegrams sent back to the configuration subscriber 105.

For structuring the automation network 100 in EtherCAT segments on the basis of on the network subscribers detected by the proposed method, various configurations are conceivable. For example, an EtherCAT segment may start at a further input/output port of a network distributor, via which only protocol-network subscribers are connected. For example, such an EtherCAT segment may extend over the second protocol-network subscriber 125, the third protocol-network subscriber 135 and the fourth protocol-network subscriber 145 and include the area of protocol-network subscribers which may be addressed with the segment address D. Such an EtherCAT segment may likewise extend over the first protocol-network subscriber 115, which may be addressed with the segment address C. A further example of an EtherCAT segment embodied in such a way is the eleventh protocol-network subscriber 185 which may be addressed with the segment address M.

Furthermore, an EtherCAT segment may begin at a further input/output port of a network distributor via which protocol-network subscribers and network distributors are connected, wherein a further input/output port is set for this purpose in the network distributors. For example, an Ether- CAT segment embodied in this way may comprise the fifth protocol-network subscriber 155, the second network distributor 130 (provided that the second input/output port P1 of the second network distributor 130 is set accordingly), the sixth protocol-network subscriber 160 and the seventh protocol-network subscriber 165. According to a further example, the EtherCAT segment may include the eighth protocol-network subscriber 170, the third network distributor 140, the ninth protocol-network subscriber 175 and the tenth protocol-network subscriber 180.

Moreover, an EtherCAT segment may start at configuration subscriber 105 and end at the next network distributor. The EtherCAT segment may e.g. include the configuration subscriber 105 and the first network distributor 120.

In order to simplify the description of the EtherCAT segments, the corresponding data lines have been described above. For reasons of clarity, as well, the EtherCAT segment embodiments have been described above.

The present invention has been described in detail by preferred embodiment examples. Instead of the described embodiment examples, further embodiment examples are conceivable which may comprise further modifications or combinations of described features. For this reason, the present invention is not restricted by the disclosed examples, since other variations may be derived from them by a person skilled in the art without exceeding the scope of protection of the invention.

TABLE 1

List of references

| | |
|---|---|
| 100 automation network | 200 third network subscriber |
| 105 configuration subscriber | 205 first data line |
| 110 master-network subscriber | 210 second data line |
| 115 first protocol-network subscriber | 215 third data line |
| 120 first network distributor | 220 fourth data line |
| 125 second protocol-network subscriber | 225 fifth data line |
| 130 second network distributor | 230 sixth data line |
| 135 third protocol-network subscriber | 235 seventh data line |
| 140 third network distributor | 240 eighth data line |
| 145 fourth protocol-network subscriber | 245 ninth data line |
| 155 fifth protocol-network subscriber | 250 tenth data line |
| 160 sixth protocol-network subscriber | 255 eleventh data line |
| 165 seventh protocol-network subscriber | 260 twelfth data line |
| 170 eighth protocol-network subscriber | 400 flow chart |
| 175 ninth protocol-network subscriber | 410 start |
| 180 tenth protocol-network subscriber | 415 first step |
| 185 eleventh protocol-network subscriber | 420 first branch |
| 190 first network subscriber | 425 second step |
| 195 second network subscriber | 430 second branch |
| P0 first input/output port | 435 third branch |
| P1 second input/output port | 440 fourth branch |
| P2 third input/output port | 445 fourth step |
| P3 fourth input/output port | 450 fifth step |
| P4 fifth input/output port | 455 sixth step |
| P5 sixth input/output port | 460 seventh step |
| P6 seventh input/output port | 465 eighth step |
| P7 eighth input/output port | 470 ninth step |
| | 475 end |
| | 480 third step |

The invention claimed is:

1. A method for detecting network subscribers in an automation network by query telegrams sent by a configuration subscriber, wherein:
   wherein the network subscribers in the automation network are connected via data lines and the network subscribers comprise at least one protocol-network subscriber configured to process a particular data-transmission protocol, and the network subscribers comprise at least one network distributor having input/output ports,
   when a protocol-network subscriber receives a query telegram over a data line, the protocol-network subscriber enters a network-subscriber information into the query telegram and sends the query telegram to a subsequent network subscriber via a data line other than the receiving data line or, if no subsequent network subscriber is connected to another data line the protocol-network subscriber returns the query telegram to the configuration subscriber via the receiving data line,
   when a network distributor receives the query telegram over the data line on a first input/output port, the network distributor enters a port information on further input/output ports of the network distributor, to which further data lines are connected, into the query telegram and returns the query telegram to the configuration subscriber via the receiving data line, and
   when the configuration subscriber receives the query telegram from the network distributor over the data line, the configuration subscriber generates, on the basis of the port information, further query telegrams, each with a routing information, and sends the further query telegrams to the network distributor via the data line, and the network distributor outputs the further query telegrams in each case on the further input/output port assigned to the respective routing information in order to detect the network subscribers, which are connected to the respective further input/output ports of the network distributor via the further data lines.

2. The method according to claim 1, wherein:
   the routing information is preset in the network distributor, and
   the port information comprises the routing information and the network distributor enters the port information into the query telegram and returns the query telegram to the configuration subscriber via the receiving data line.

3. The method according to claim 1, wherein the configuration subscriber, after receiving the query telegram comprising the port information from the network distributor and before sending the further query telegrams, sends a configuration telegram over the data line to the network distributor in order to assign the routing information to the further input/output ports of the network distributor in each case on the basis of the port information.

4. The method according to claim 1, wherein:
   the configuration subscriber defines a time window in which the configuration subscriber expects a sent query telegram to be returned, and
   if the configuration subscriber does not receive a query telegram within the specified time window, the configuration subscriber excludes the data line on which the query telegram was output from further data communication.

5. The method according to claim 1, wherein the network-subscriber information comprises a network-subscriber identifier and a data-transmission rate of the protocol network subscriber.

6. The method according to claim 1, wherein the port information comprises a port identifier and a data-transfer rate of the respective further input/output port of the network distributor.

7. The method according to claim 1, wherein the query telegrams and a configuration telegram are configured as telegrams with underlying EtherCAT data-transmission protocol.

8. An automation network having network subscribers which are connected via data lines, wherein:
the network subscribers in the automation network have at least one protocol-network subscriber configured to process a specific data-transmission protocol, and the network subscribers comprise at least one network distributor having input/output ports,
a configuration subscriber is configured to send a query telegram via a data line,
a protocol-network subscriber is configured, when the protocol-network subscriber receives the query telegram via a data line, to enter network-subscriber information into the query telegram and send the query telegram to a subsequent network subscriber via a data line other than the receiving data line or, if no subsequent network subscriber is connected to further data line, the protocol-network subscriber is configured to return the query telegram to the configuration subscriber via the receiving data line, and
a network distributor is configured, when the network distributor receives the query telegram over the data line on a first input/output port, to enter a port information on further input/output ports of the network distributor, to which further data lines are connected, into the query telegram and return the query telegram to the configuration subscriber via the receiving data line;
wherein the configuration subscriber is configured, when the configuration subscriber receives the query telegram from the network distributor over the data line, to generate, on the basis of the port information, further query telegrams with one routing information each and to send the further query telegrams to the network distributor via the data line, and the network distributor is configured to output the further query telegrams in each case on the further input/output port assigned to the respective routing information, to detect the network subscribers connected to the respective further input/output ports of the network distributor via the further data lines.

9. The automation network according to claim 8, wherein:
the routing information is preset in the network distributor, and
the port information comprises the routing information and the network distributor is adapted to enter the port information into the query telegram and to return the query telegram to the configuration subscriber via the receiving data line.

10. The automation network according to claim 8, wherein the configuration subscriber is configured, after receiving the query telegram with the port information from the network distributor and before sending the further query telegrams, to send a configuration telegram over the data line to the network distributor in order to assign the routing information to the further input/output ports of the network distributor in each case on the basis of the port information.

11. The automation network according to claim 8, wherein:
the configuration subscriber is adapted to define a time window in which the configuration subscriber expects a sent query telegram to be returned, and
the configuration subscriber is adapted to exclude the data line on which the query telegram was issued from further data communication if the configuration subscriber does not receive a query telegram within the specified time window.

12. The automation network according to claim 8, wherein the network-subscriber information comprises a network-subscriber identifier and a data-transmission rate of the protocol network subscriber.

13. The automation network according to claim 8, wherein the port information comprises a port identifier and a data-transfer rate of the respective further input/output port of the network distributor.

14. The automation network according to claim 8, wherein the query telegrams and a configuration telegram are configured as telegrams with underlying EtherCAT data-transmission protocol.

* * * * *